(12) United States Patent
Kajita et al.

(10) Patent No.: US 7,755,295 B2
(45) Date of Patent: Jul. 13, 2010

(54) VEHICLE HEAD LAMP DEVICE

(75) Inventors: Yuji Kajita, Chita-gun (JP); Naohito Kato, Kariya (JP)

(73) Assignee: Denso Corporation, Kariya (JP)

( * ) Notice: Subject to any disclaimer, the term of this patent is extended or adjusted under 35 U.S.C. 154(b) by 448 days.

(21) Appl. No.: 11/651,865

(22) Filed: Jan. 10, 2007

(65) Prior Publication Data

US 2007/0159118 A1 Jul. 12, 2007

(30) Foreign Application Priority Data

Jan. 12, 2006 (JP) .............................. 2006-004796

(51) Int. Cl.
*B60Q 1/02* (2006.01)

(52) U.S. Cl. .......................................... 315/82; 361/18

(58) Field of Classification Search ................. 315/312, 315/82, 291; 361/18; 363/50; 307/10.1, 307/10.8
See application file for complete search history.

(56) References Cited

U.S. PATENT DOCUMENTS

| | | | |
|---|---|---|---|
| 4,593,233 A * | 6/1986 | Taylor et al. ................. 315/307 |
| 5,805,061 A | 9/1998 | Fritz et al. | |
| 6,870,328 B2 * | 3/2005 | Tanabe et al. ................ 315/291 |
| 6,885,297 B2 * | 4/2005 | Fleury ......................... 340/516 |
| 6,963,177 B2 | 11/2005 | Ito et al. | |
| 7,224,150 B2 * | 5/2007 | Iwabuki et al. ............... 323/225 |
| 7,329,998 B2 * | 2/2008 | Jungwirth .................... 315/291 |
| 7,642,723 B2 * | 1/2010 | Ishii ............................ 315/77 |
| 2003/0025465 A1 * | 2/2003 | Swanson et al. ............. 315/291 |
| 2004/0207328 A1 | 10/2004 | Ito et al. | |
| 2005/0062445 A1 * | 3/2005 | Toyota et al. ................ 315/312 |
| 2005/0174420 A1 * | 8/2005 | Hayashi ....................... 347/130 |
| 2006/0152175 A1 * | 7/2006 | Clauberg .................... 315/312 |
| 2007/0024213 A1 * | 2/2007 | Shteynberg et al. .......... 315/291 |
| 2007/0114951 A1 * | 5/2007 | Tsen et al. ................... 315/291 |

FOREIGN PATENT DOCUMENTS

| | | |
|---|---|---|
| DE | 198 41 490 | 3/2000 |
| DE | 101 46 191 | 4/2003 |
| DE | 198 41 490 B4 * | 6/2005 |
| EP | 0 955 619 | 11/1999 |

(Continued)

OTHER PUBLICATIONS

Examination Report in corresponding DE Application No. 10 2007 001 501.3 dated Mar. 12, 2007.

(Continued)

*Primary Examiner*—Adolf Berhane
*Assistant Examiner*—Yemane Mehari
(74) *Attorney, Agent, or Firm*—Harness, Dickey & Pierce, PLC (57) ABSTRACT

A head lamp device for a vehicle includes a DC power source, a diode array having a plurality of series-connected light emitting diodes and a current control circuit that supplies driving current to the diode array. The current control circuit is constituted of a current supply circuit, a voltage measuring circuit, a comparing circuit that compares the voltage drop with a reference value, a judging circuit for judging that there is a short-circuiting at any of the light emitting diodes based on the comparison by the comparing circuit, and a display unit for displaying an alarm when the judging circuit judges that there is a short-circuiting.

9 Claims, 6 Drawing Sheets

FOREIGN PATENT DOCUMENTS

| | | |
|---|---|---|
| EP | 0 877 900 | 10/2003 |
| JP | 02-287492 | 11/1990 |
| JP | 10-217851 | 8/1998 |
| JP | 11-135276 | 5/1999 |
| JP | 2000-098941 | 4/2000 |
| JP | 2004-314808 | 11/2004 |
| JP | 2007-015578 | 1/2007 |

OTHER PUBLICATIONS

Office Action dated Dec. 6, 2007 in German Application No. 10 2007 001501.3-31 with English translation.

Office action dated Jul. 2, 2009 in corresponding German Application No. 10 2007 001 501.3.

Office action dated Oct. 19, 2009 in corresponding Japanese Application No. 2006-4796.

* cited by examiner

VEHICLE HEAD LAMP DEVICE

CROSS REFERENCE TO RELATED APPLICATION

The present application is based on and claims priority from Japanese Patent Application 2006-4796, filed Jan. 12, 2006, the contents of which are incorporated herein by reference.

BACKGROUND OF THE INVENTION

1. Field of the Invention

The present invention relates to a head lamp device for a vehicle that includes light emitting diodes.

2. Description of the Related Art

JP-A2004-51014 or its counterpart U.S. Pat. No. 6,870,328 B2, discloses a head lamp device that includes a diode array circuit comprised of plural light emitting diodes. Because the voltage drop of the light emitting diode (hereinafter referred to as LED) is as small as the voltage drop of a common diode in the forward direction, it is easy to adjust its resistance to be connectable to a battery of a certain voltage by connecting a suitable number of LEDs in series. JP-A-10-217851 proposes to detect breakdown of an LED by measuring the impedance thereof. JP-A-2000-98941 discloses an array of series-connected diodes that has a bypass circuit at each junction of the diodes to secure operation of other normal diodes even when one diode breaks down. JP-A-2004-314808 proposes to detect the breakdown of the LED based on a voltage drop of a series-circuit of a current detecting resistor and a series-connected diode.

In such a head lamp device that includes an array of many LEDs, a short circuiting may take place. Because the voltage drop of the LED is very small, decrease in the light intensity of the array as a whole is not so significant even when one or two LEDs are short-circuited. However, the light intensity at a specific area may become lower than a suitable intensity.

SUMMARY OF THE INVENTION

Therefore, an object of the invention is to solve the above stated problem.

According to a feature of the invention, a head lamp device for a vehicle includes a DC power source, a diode array of a plurality of series-connected light emitting diodes and a current control circuit, which includes current supply means for supplying controlled current to the diode array, voltage measuring means for measuring forward voltage drop of the light emitting diodes, a comparing means that compares the voltage drop with a reference value, judging means for judging whether there is a short-circuiting at any of the light emitting diodes based on the comparison by the comparing means, and display means for displaying an alarm when the judging means judges that there is short-circuiting.

If a short-circuiting occurs, the driving current increases due to decrease in the resistance thereof, so that significant decrease in the light intensity of the diode array can be prevented, while the short-circuiting of the LED can be easily detected.

In the above head lamp device, the current supply means may include a current measuring circuit that measures current supplied to the diode array, a DC-DC converter for converting voltage of the DC power source to a voltage suitable to the diode array, and a feedback control circuit for controlling current supplied to the diode array according to current measured by the current measuring circuit. Therefore, increase in the driving current due to a short-circuiting can be limited to a maximum allowable amount.

Further, the current control circuit may include a memory for storing data of the voltage drop of the light emitting diodes. In this embodiment, the judging means judges that there is a short-circuiting if the voltage drop of one of the light emitting diode is a predetermined value smaller than the voltage drop of the one of the light emitting diodes that is stored in the memory. In addition, the voltage measuring means may include a plurality of voltage sensors for respectively detecting voltage drops of plural sections. In this case, the judging means judges whether there is a short-circuiting or not based on the comparison of the voltage drop of each of the sections with the reference value. Therefore, the short-circuiting can be accurately detected.

Furthermore, the current supply means may include a current detecting resistor connected between the diode array and the DC power source and a comparator for comparing a voltage drop of the current detecting resistor with a threshold value. The current supply means may further include an over-current-prevention circuit for stopping current supplied to the diode array if the amount of the current becomes a threshold value or larger. The over-current-prevention circuit may include a current limiting transistor connected between the diode array and the current detecting resistor, a comparator for turning off the current limiting transistor if the current detected by the current detecting resistor exceeds a maximum allowable amount. The comparator may change the its threshold value to increase the driving current if the judging means judges that there is a short-circuiting.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Some preferred embodiments according to the present invention will be described with reference to the appended drawings.

Figure 1:
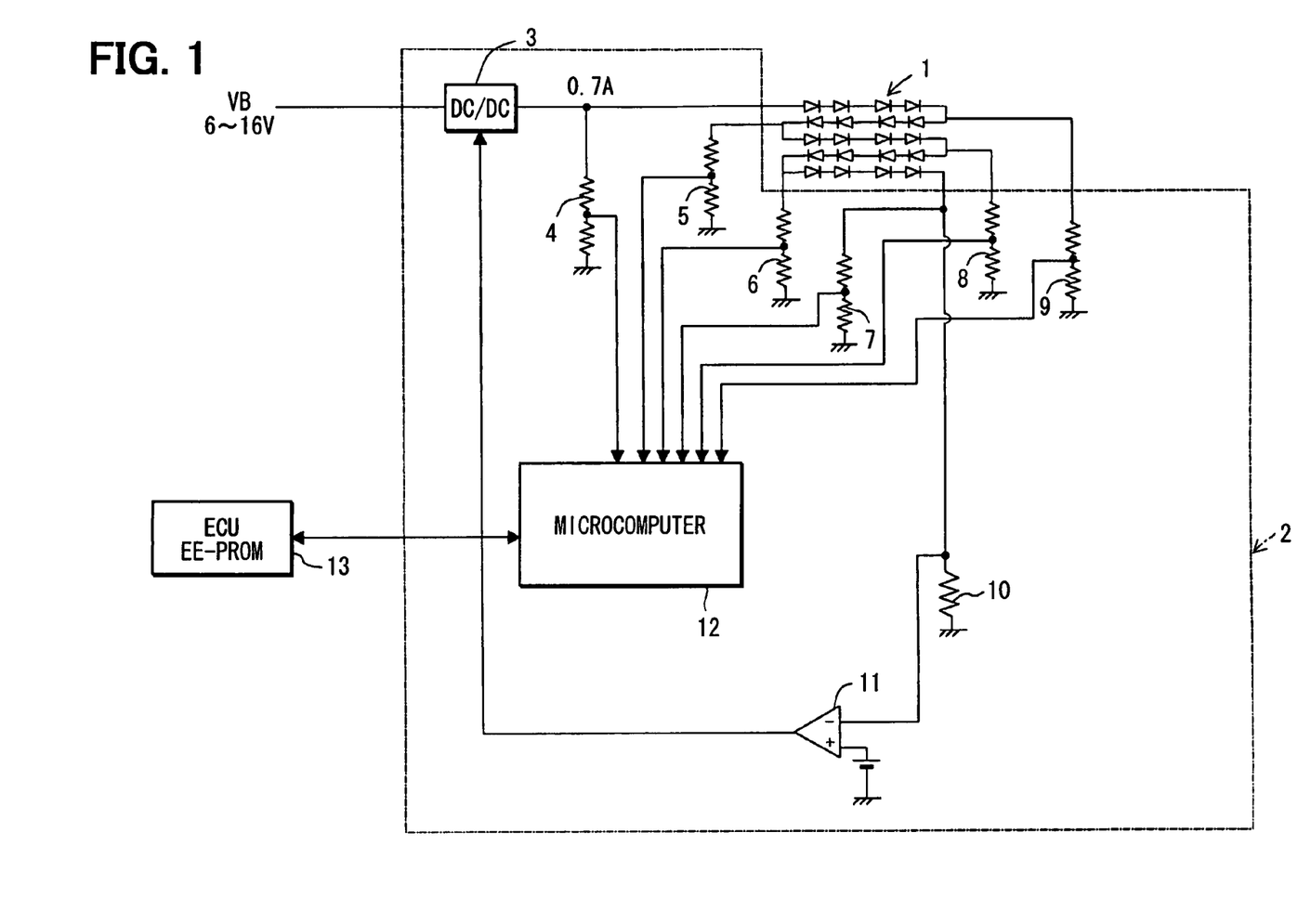
FIG. 1 is a circuit diagram of a vehicle head lamp device according to the first embodiment of the invention.

A head lamp device for a vehicle according to the first embodiment of the invention will be described with reference to FIG. 1.

The head lamp device includes an array of LEDs (hereinafter referred to the diode array) 1, a current control circuit 2 and an electronic control unit (ECU) 13.

The diode array 1 is comprised of 20 series-connected LEDs, each of which is applied a DC voltage between 3.3 and 4.5 volts so as to pass current of 0.7 A.

The current control circuit 2 includes a boosting DC-DC converter 3, voltage dividing circuits 4-9, a current detecting resistor 10, a comparator 11 and a microcomputer 12.

The boosting DC-DC converter 3 boosts the voltage of a DC power source to drive to the diode array 1 and the current control circuit 2. The DC-DC converter 3 is a common chopper type converter that includes a switching transistor, a rectifier and a smoothing capacitor. The switching transistor switches on and off current flowing therethrough at a certain frequency to generate AC electric power of a higher voltage, which is rectified by the rectifier and smoothed by the smoothing capacitor to provide the DC power to drive the diode array 1. The boosting ratio of the boosting DC-DC converter 3 can be changed by changing the duty ratio of the switching transistor.

The diode array 1 is divided into 5 sections, each of which has 4 series-connected LEDs. The voltage dividing circuit 4 provides a voltage signal of the forward voltage of the diode array 1 to input the voltage signal to the microcomputer 12. Each of the other voltage dividing circuits 5-9 also provides a voltage signal of the forward voltage of the corresponding section of the diode array 1 to input the voltage signal to the microcomputer 12.

The comparator 11 compares the voltage drop of the current detecting resistor 10 with a threshold voltage that corresponds to the driving current of 0.7 A and provides a signal when the amount of the driving current becomes larger than 0.7 A. The output signal of the comparator 11 is sent to the DC-DC converter to stop its operation. That is, the current supplied to the diode array 1 is feedback-controlled and limited to be less than 0.7 A.

The microcomputer 12 examines if there is a short-circuiting at any one of the sections of the LEDs or not based on the voltage signals provided by the voltage dividing circuits 4-9. If there is a short-circuiting at any of the sections of the diode array 1, the microcomputer sends a short-circuiting signal to the ECU 13, which gives an alarm or signal to request for replacement of the diode array 1. Before the head lamp device is shipped, the microcomputer 12 detects forward voltage of each section of the diode array 1 and writes the voltage into a nonvolatile memory (e.g. EEPROM) that is mounted in the ECU 13.

Thereafter, the microcomputer periodically detects the voltage of each section of the diode array 1 while the head lamp device operates, and the voltage data are sent to the ECU 13. Incidentally, the voltage of each section is detected at the same timing in the operation cycle of the switching transistor of the boosting DC-DC converter in order to eliminate an influence of a ripple voltage component included in the output voltage of the DC-DC converter 3. The ECU 13 compares the voltage data with voltage data that are previously stored the memory such as an EEPROM to examine if there is a short-circuiting or not. If the newly detected voltage of any section of the diode array is a predetermined value lower than the previously stored voltage of the corresponding section of the diode array, it is determined that there is a short-circuiting. If all of the sections of the diode array found normal, the previously stored data of the voltage may be replaced with the new data to compensate variations of the diode array with age.

An ambient temperature may be detected and stored when the data are stored so that the examination of the short-circuiting can be more accurately achieved by taking a difference between the present ambient temperature and the previously stored ambient temperature into account.

Figure 2:
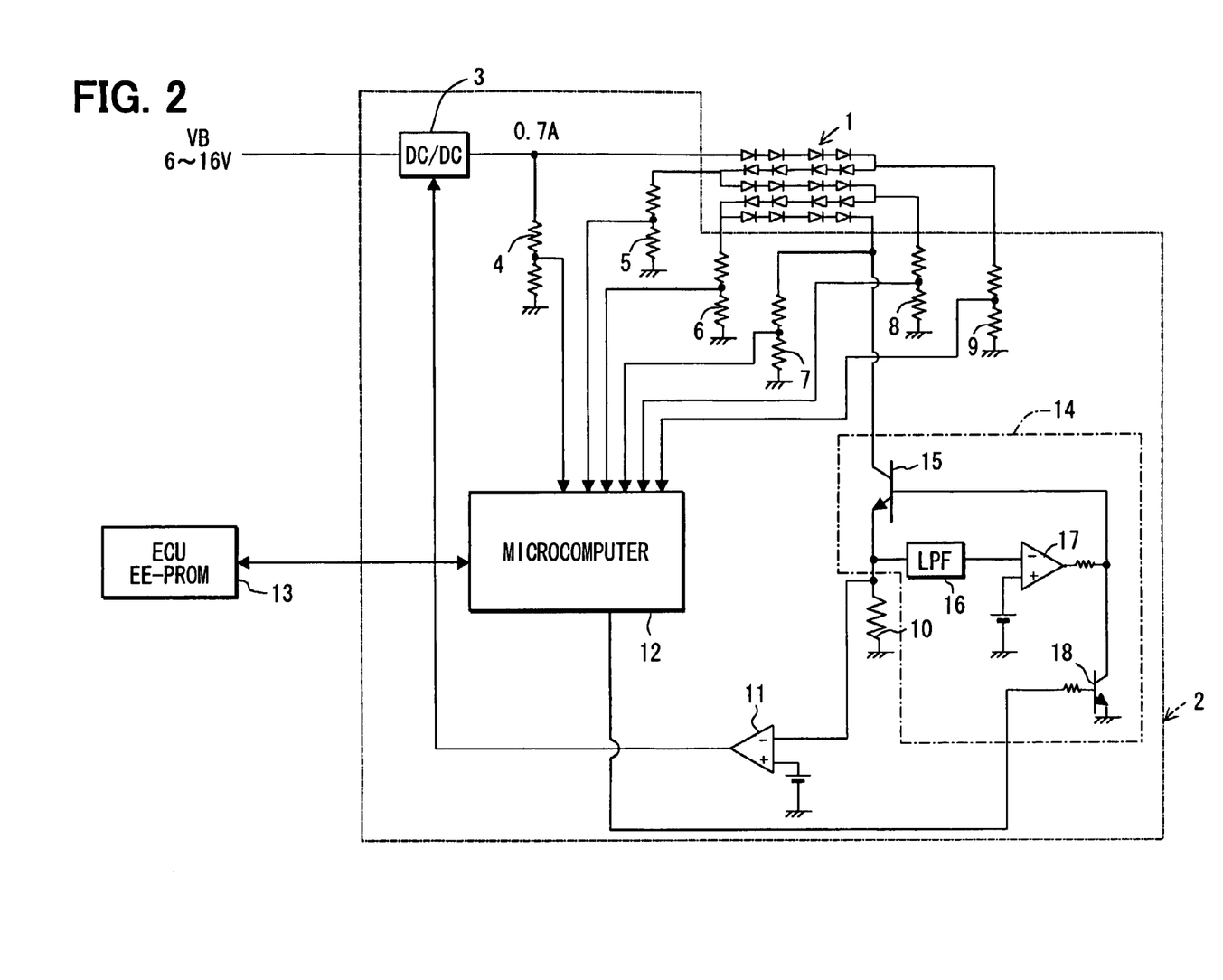
FIG. 2 is a circuit diagram of a vehicle head lamp device according to the second embodiment of the invention.

A head lamp device according to the second embodiment will be described with reference to FIG. 2. Incidentally, the same reference numeral corresponds to the same or substantially the same part, portion or composition of the head lamp device according to the first embodiment, hereafter.

The head lamp device according to the second embodiment has a current control circuit 2 that includes a over-current prevention circuit 14 in addition to the boosting DC-DC converter 3, voltage dividing circuits 4-9, a current detecting resistor 10, a comparator 11 and a microcomputer 12.

The over-current-prevention circuit 14 includes a power transistor 15, a low-pass filter 16, a comparator 17 and a transistor 18.

The power transistor 15 is connected in series with the diode array 1 and the current detecting resistor 10. The voltage drop of the current detecting resistor 10 is inputted to the comparator 17, which turns off the transistor 15 if the amount of the current flowing through the current detecting resistor 10 becomes as much as 0.75 A. If the microcomputer 12 judges short-circuiting of one or more sections of the diode array or detects failure of the feedback control of the DC-DC converter 3 due to the short-circuiting, the microcomputer 12 controls the transistor 18 to turn on, thereby to turn off the transistor 15. The low-pass filter 16 removes high frequency ripple components included in the output voltage of the DC-DC-converter 3. The transistor 18 may be connected to the transistor included in the DC-DC converter 3 to turn off this transistor in stead of transistor 15. It is also possible to connect this transistor 18 to the low-pass filter 16 so that the low-pass filter 16 can control this transistor 18 without the comparator 17.

Figure 3:
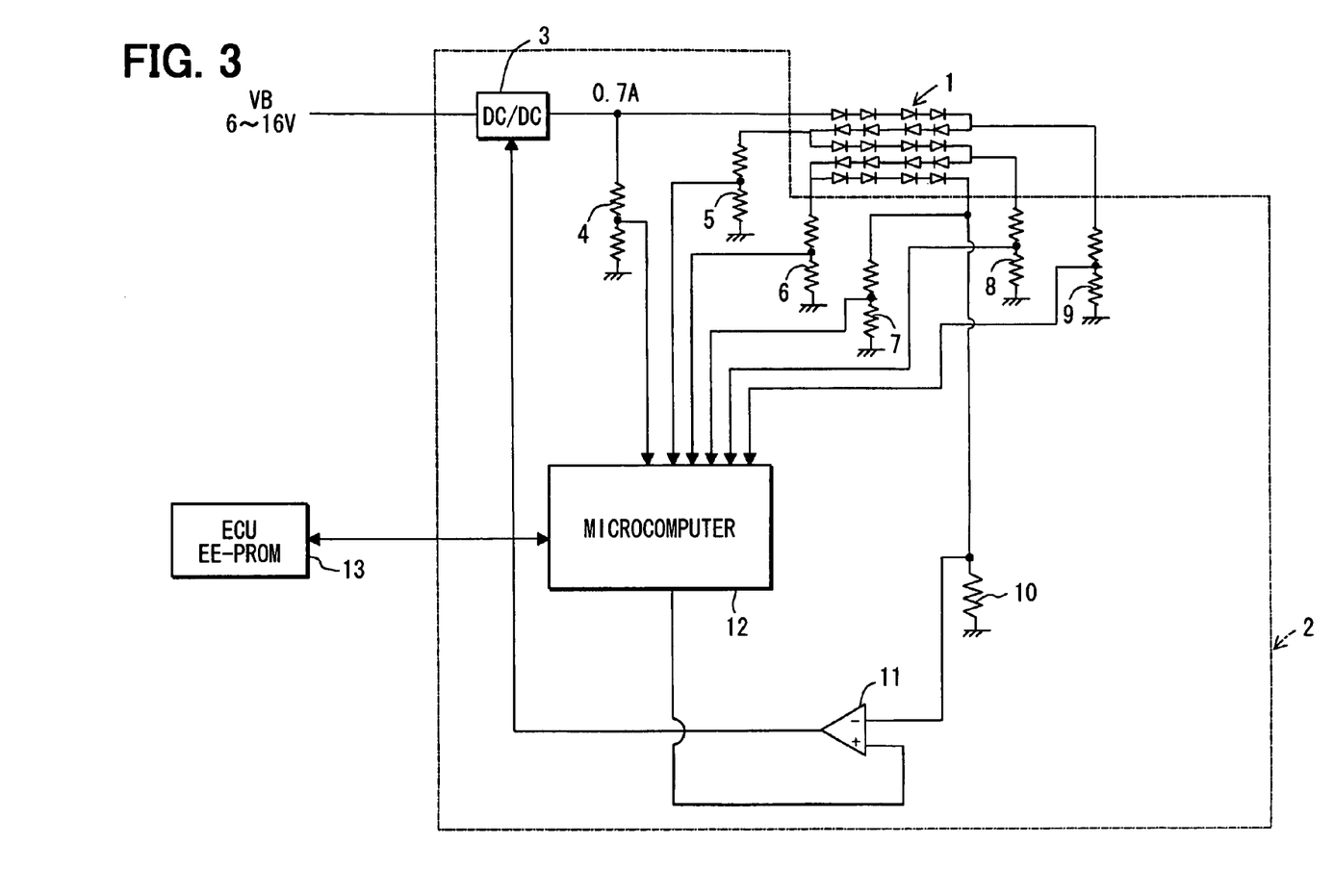
FIG. 3 is a circuit diagram of a vehicle head lamp device according to the third embodiment of the invention.

A head lamp device according to the third embodiment will be described with reference to FIG. 3.

In this head lamp device, the threshold voltage of the comparator is controlled by the microcomputer 12. The maximum allowable current of the diode array and the minimum allowable current are respectively set to 0.75 and 0.65 A.

If the microcomputer 12 judges short-circuiting of one of the LEDs in the sections 4-9 of the diode array 1, the microcomputer 12 changes the threshold voltage from a voltage that corresponds to the normal current of 0.7 A to a voltage that corresponds to the maximum allowable current of 0.75 A. Accordingly, the current supplied to the diode array 1 increases to thereby increase the light intensity of the diode array 1.

Figure 4:
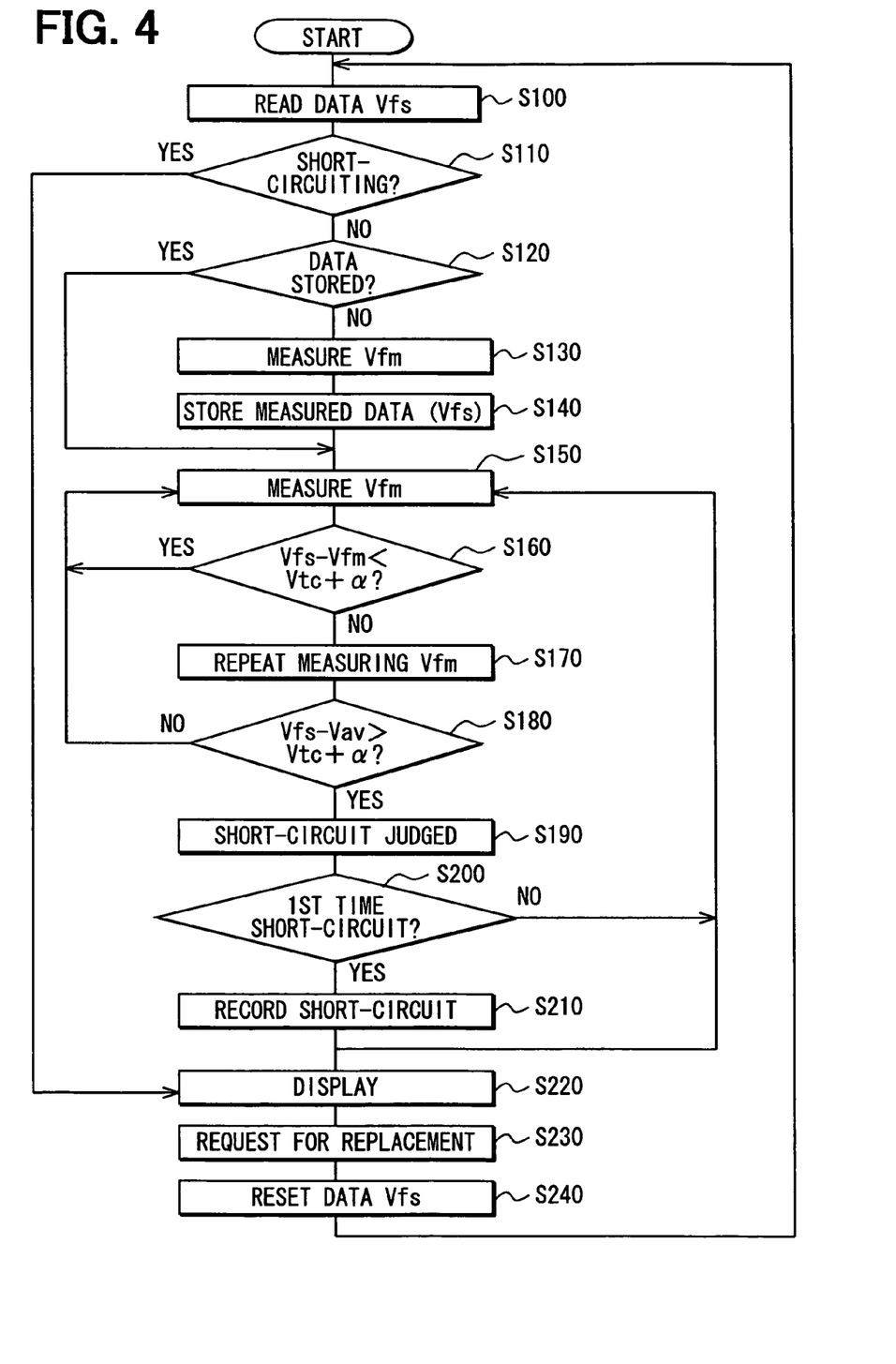
FIG. 4 is a flow diagram of an operation of a vehicle head lamp device according to the fourth embodiment of the invention.

A head lamp device according to the fourth embodiment will be described with reference to a flow diagram shown in FIG. 4.

This head lamp device may be the same in structure as any one of the previous embodiments.

At first, the forward voltage data (Vfs) of the sections of the diode array 1 are read from the EEPROM at S100. Then, whether or not there is a short-circuiting in the diode array 1 is examined based on the data at S110. If the result of the examination is No, whether initial forward voltage data of Vfs of the sections of the diode array 1 are stored or not is examined at S120. If the result of the step S120 is No, the forward voltages of the sections of the diode array 1 are measured at S130. Then, the data of the forward voltage Vfm are stored as Vfs in the EEPROM at S140.

After a certain time period, the forward voltage Vftn of the sections of the diode array 1 is measured at S150, and whether the diode array 1 is normal or not is examined by comparing the measured data of Vfm with the stored data of Vfs at S160. At this step 160, whether the difference in the forward voltage of each corresponding section of the diode array 1 between the measured data of Vfm and the stored data of Vfs is not smaller than a certain value a, is examined after taking the temperature characteristic Vtc of the LED into account, No is given to go to S170, where the forward voltage of each section of the diode array 1 is repeatedly (Q times) measured to have an average value Vav of the measured forward voltages. Subsequently, whether or not the difference in the forward voltage of each corresponding section of the diode array 1 between the mean value Vav and the stored data of Vfs is larger than the certain value a after taking the temperature characteristic Vtc of the LED into account is examined at S180. If the result of S180 is Yes, it is determined that there is a short-circuiting at S190.

Thereafter, whether the short-circuiting occurs first time or not is examined at S200, this short-circuiting record is stored into the EEPROM at S210 if the result of S200 is Yes, an alarm is displayed on a display panel at S220, a signal of requesting for replacement of the diode array is given at S230, and the data previously stored in the EEPROM is reset at S240. Thereafter, the step returns to the start of the program.

If the result of the examination at S110 is Yes (there is a short-circuiting), the step goes to S220, which is followed by steps S230 and S240. If the result of the examination at S120 is Yes (the data are stored), the step goes to S150. If the result of the examination at S180 is Yes (the difference in the forward voltage of each corresponding section of the diode array 1 between the mean values and the stored data is not larger than the certain value α after taking the temperature characteristic of the LED into account), the step goes to S150. If the result of the examination at S200 is No (the short-circuiting does not occur first time), the step also goes to S150.

Figure 5:
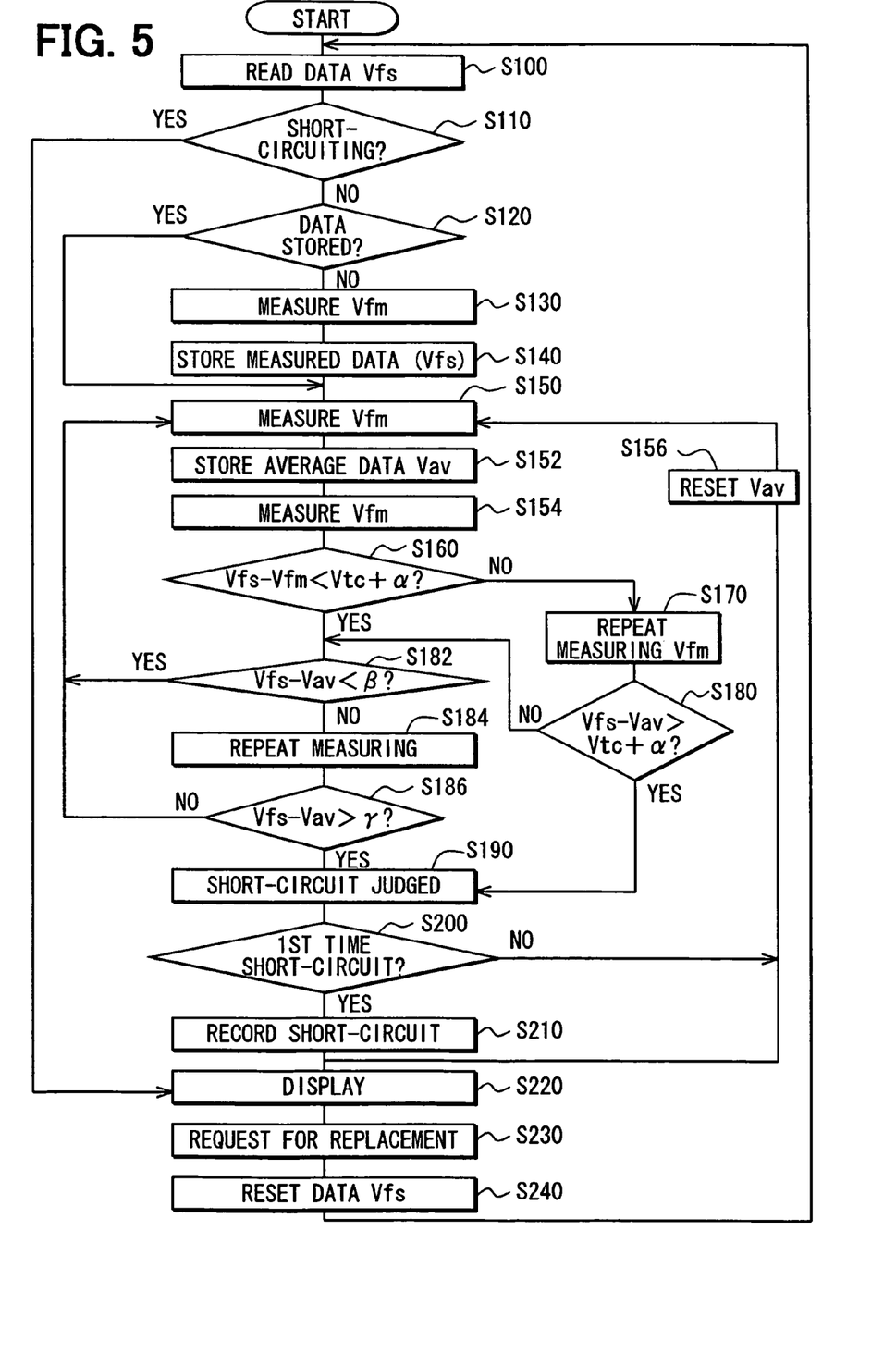
FIG. 5 is a flow diagram of an operation of a vehicle head lamp device according to the fifth embodiment of the invention.

A head lamp device according to the fifth embodiment will be described with reference to a flow diagram shown in FIG. 5.

This head lamp device may be the same in structure as any one of the previous embodiments. Incidentally, because the same reference numeral corresponds to the same or substantially the same step of the flow diagram of the third embodiment shown in FIG. 4, only steps different from the third embodiment will be further described.

After measuring the forward voltage Vfm of the sections of the diode array 1 at step S150, the step goes to S152, where the average data Vav of the data that have been measured are stored. After a certain time interval, the forward voltages Vfm of the sections of the diode array 1 are measured again at step S154, which is followed by S160, where whether the difference in the forward voltage of each corresponding section of the diode array 1 between the measured data of Vfm and the stored data of Vfs is not smaller than a certain value α is examined after taking the temperature characteristic Vtc of the LED into account. If the result of S160 is Yes, whether the difference in the forward voltage of each corresponding section of the diode array 1 between the measured data of Vfm and the stored data of Vfs is not smaller than a first value β is examined at S182. If the result of S182 is No, the forward voltage of each section of the diode array 1 is repeatedly (e.g. M times) measured to have average value data Vav of the measured forward voltages at S184, and whether the difference in the forward voltage of each corresponding section of the diode array 1 between the stored data of Vfs and the newly measured data of Vfin is larger than a second value γ is examined at S186 which is followed by the step S190, which is followed by S200, S210, S230 and S240.

Figure 6:
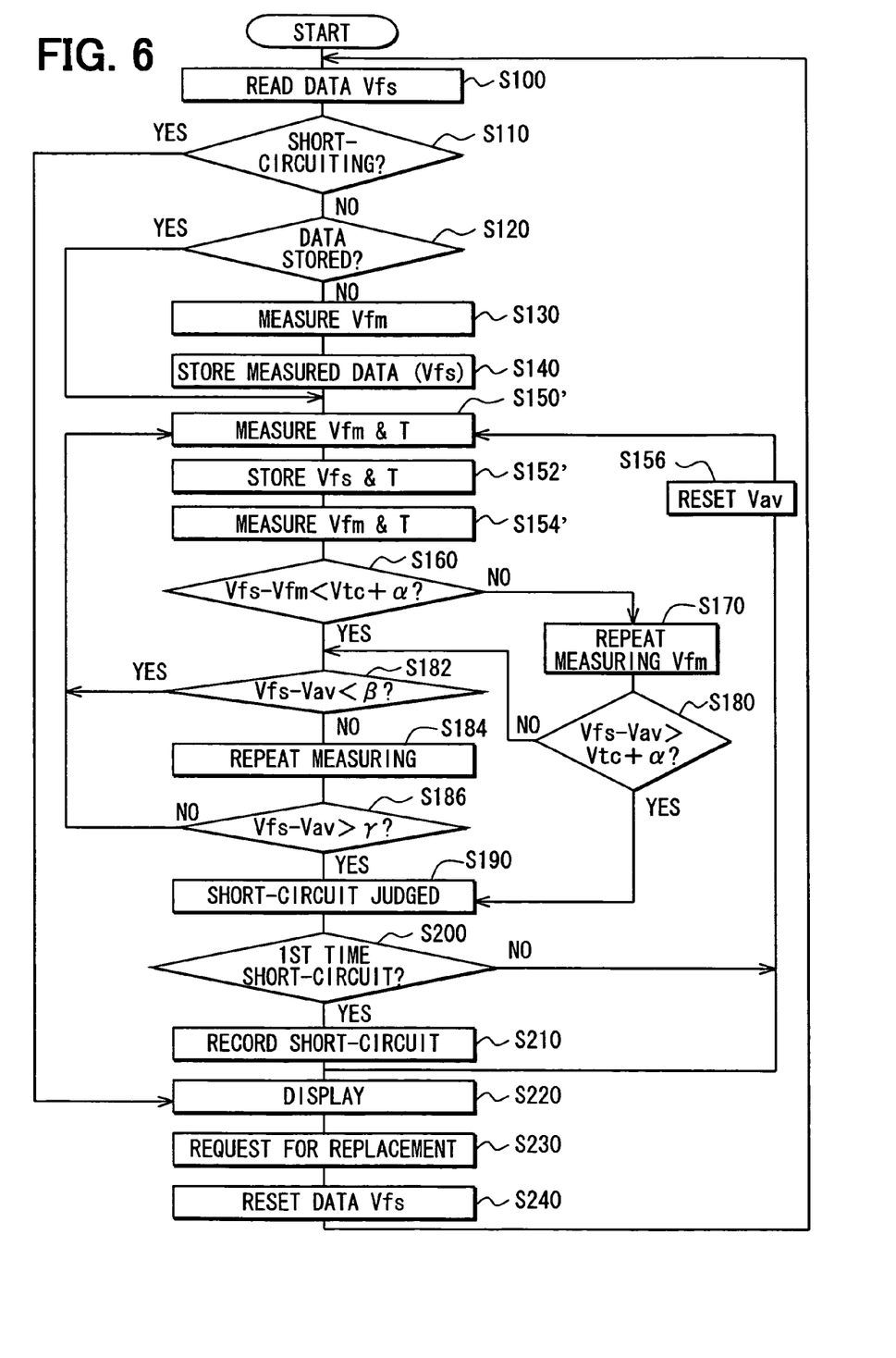
FIG. 6 is a flow diagram of an operation of a vehicle head lamp device according to the sixth embodiment of the invention.

A head lamp device according to the sixth embodiment will be described with reference to a flow diagram shown in FIG. 6.

This head lamp device may be the same in structure as any one of the previous embodiments. Because the same reference numeral corresponds to the same or substantially the same step of the flow diagram of the third embodiment shown in FIG. 4, only steps different from the fourth embodiment will be further described.

After S140, the step goes to S150', where the forward voltage Vfm of the sections of the diode array 1 and ambient temperature T thereof are measured. Thereafter, the step goes to S152', where the data of Vfm (which becomes Vfs) and the temperature T are stored. After a certain time interval, the forward voltages Vfm of the sections of the diode array 1 and the ambient temperature T thereof are measured again at step S154', which is followed by S160.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A head lamp device for a vehicle including a DC power source, a diode array having a plurality of series-connected light emitting diodes and a current control circuit that supplies driving current to said diode array, wherein said current control circuit comprises:
   means for supplying driving current to said diode array;
   means for measuring a voltage drop of each of a plurality of sections of said light emitting diodes;
   means for comparing the voltage drop of each of said plurality of sections of light emitting diodes with the voltage drop of each of said plurality of sections of said light emitting diodes;
   means for judging a short-circuiting at any of said plurality of sections of said light emitting diodes based on the comparison by said comparing means; and
   means for displaying an alarm when said judging means judges that there is a short-circuiting; wherein
   said supplying means comprises a current measuring circuit that measures current supplied to said diode array, a DC-DC converter for converting voltage of said DC power source to a voltage suitable to said diode array; and a feedback control circuit, connected between said current measuring circuit and said DC-DC converter, for controlling driving current supplied to said diode array according to current measured by said current measuring circuit; and
   said feedback control circuit increases the driving current when said judging means judges that there is a short-circuiting.

2. A head lamp device as in claim 1, wherein:
   said current control circuit further comprises a memory for storing data of the voltage drop of said light emitting diodes;
   said judging means judges a short-circuiting if the voltage drop of one of said plurality of sections of said light emitting diode measured by said measuring means is a predetermined value smaller than the reference voltage drop of the one of said plurality of sections of said light emitting diodes that is stored in said memory.

3. A head lamp device as in claim 1, wherein said supplying means includes a current detecting resistor connected between said diode array and said DC power source and a comparator for comparing a voltage drop of said current detecting resistor with a threshold value.

4. A head lamp device as in claim 1, wherein said DC-DC converter comprises a boosting converter.

5. A head lamp device as in claim 1, wherein said measuring means measures the voltage drops at the same timing as a switching operation of a DC-DC converter.

6. A head lamp device for a vehicle including a DC power source, a diode array having a plurality of series-connected light emitting diodes and a current control circuit that supplies driving current to said diode array, wherein said current control circuit comprises:
    means for supplying driving current to said diode array;
    means for measuring a voltage drop of each of a plurality of sections of said light emitting diodes;
    means for comparing the voltage drop of each of said plurality of sections of light emitting diodes with the voltage drop of each of said plurality of sections of said light emitting diodes;
    means for judging a short-circuiting at any of said plurality of sections of said light emitting diodes based on the comparison by said comparing means; and
    means for displaying an alarm when said judging means judges that there is a short-circuiting; wherein
    said supplying means includes a DC-DC converter, a current detecting resistor connected between said diode array and said DC power source and a comparator for comparing a voltage drop of said current detecting resistor with a threshold value; and
    said comparator changes the threshold value to increase the driving current if said judging means judges that there is a short-circuiting.

7. A head lamp device as in claim 6, wherein:
    said current control circuit further comprises a memory for storing data of the voltage drop of said light emitting diodes;
    said judging means judges that there is a short-circuiting if the voltage drop of one of said light emitting diode measured by said voltage measuring means is a predetermined value smaller than the voltage drop of the one of said light emitting diodes that is stored in said memory.

8. A head lamp device as in claim 6, wherein said DC-DC converter comprises a boosting converter.

9. A head lamp device as in claim 6, wherein said measuring means measure voltage drops at the same timing as switching operation of said DC-DC converter.

* * * * *